(12) United States Patent
Kojima et al.

(10) Patent No.: US 7,847,464 B2
(45) Date of Patent: Dec. 7, 2010

(54) ARMATURE OF ROTARY ELECTRIC MACHINE AND METHOD FOR PRODUCING SAME

(75) Inventors: Yoshinori Kojima, Isesaki (JP); Shuji Uehara, Maebashi (JP); Yasuhiro Takebe, Ota (JP); Takayuki Ishizeki, Ota (JP); Kazuo Iwashita, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 0 days.

(21) Appl. No.: 11/663,174

(22) PCT Filed: Oct. 20, 2005

(86) PCT No.: PCT/JP2005/019305

§ 371 (c)(1),
(2), (4) Date: Mar. 19, 2007

(87) PCT Pub. No.: WO2006/043627

PCT Pub. Date: Apr. 27, 2006

(65) Prior Publication Data

US 2008/0054734 A1    Mar. 6, 2008

(30) Foreign Application Priority Data

Oct. 22, 2004    (JP)    ............................. 2004-307787

(51) Int. Cl.
*H02K 1/00*    (2006.01)
*H02K 3/00*    (2006.01)
*H02K 17/00*    (2006.01)
*H02K 19/00*    (2006.01)
*H02K 21/00*    (2006.01)
*H02K 23/26*    (2006.01)
*H02K 27/02*    (2006.01)

(52) U.S. Cl. .................. 310/195; 310/42; 310/132; 310/133; 310/140; 242/27.3; 29/597

(58) Field of Classification Search .................. 310/42, 310/132, 133, 140; 242/527.3; 29/597; *H02K 1/00, H02K 3/00, 17/00, 19/00, 21/00, 23/26, 27/02*
See application file for complete search history.

(56) References Cited

U.S. PATENT DOCUMENTS 4,262,853 A * 4/1981 Dammar .................. 242/433.3

(Continued)

FOREIGN PATENT DOCUMENTS

JP    A 6-261479    9/1994

(Continued)

*Primary Examiner*—Quyen Leung
*Assistant Examiner*—John K Kim
(74) *Attorney, Agent, or Firm*—Oliff & Berridge, PLC (57) ABSTRACT

The object of the invention is to provide an armature which is in good rotational balance, where the total number of the coils to be disposed in the slots of the rotary electric machine can be freely set when winding coils on the armature core. Coils are wound on an outer periphery of an armature core 3 by use of a winding device 7 which is provided with sixteen nozzles 11b movable in the axial direction to draw out the coils to thirty two slots formed on the outer periphery of the armature core 3, wherein sixteen coils 5 are simultaneously wound through a single winding operation and the winding operation with respect to the slot 3c is performed three times in such a manner that the total number of the coils 5 in the slots 3c becomes 96 (C) so that the number obtained by dividing the total number of the coils 5 C by twice the number of the slots does not become a natural number.

8 Claims, 5 Drawing Sheets

U.S. PATENT DOCUMENTS

| | | | |
|---|---|---|---|
| 6,075,305 A * | 6/2000 | Daikoku et al. | 310/233 |
| 6,218,755 B1 * | 4/2001 | Tanaka et al. | 310/204 |
| 6,565,032 B1 * | 5/2003 | Kobayashi et al. | 242/433.3 |
| 7,000,307 B2 * | 2/2006 | Wang | 29/596 |
| 2003/0106955 A1 * | 6/2003 | Becherucci et al. | 242/432.5 |
| 2004/0027023 A1 * | 2/2004 | Kuenzel et al. | 310/179 |
| 2004/0139595 A1 * | 7/2004 | Hockaday et al. | 29/597 |
| 2008/0054734 A1 * | 3/2008 | Kojima et al. | 310/42 |

FOREIGN PATENT DOCUMENTS

| | | |
|---|---|---|
| JP | A 10-112948 | 4/1998 |
| JP | A 10-174382 | 6/1998 |
| JP | A 10-295062 | 11/1998 |
| JP | A 2000-262022 | 9/2000 |
| JP | A 2000-262023 | 9/2000 |
| WO | WO 02/080340 A1 | 10/2002 |

* cited by examiner

ARMATURE OF ROTARY ELECTRIC MACHINE AND METHOD FOR PRODUCING SAME

This application is the U.S. National Stage of PCT/JP2005/ 019305, filed Oct. 10, 2005, which claims priority from JP 2004-307787 filed Oct. 22, 2004, the entire disclosures of which are incorporated herein in the entireties by reference thereto.

BACKGROUND

The related technical fields include armatures for a rotary electric machine that are components of electric equipment of, for example, a vehicle and a method for producing the armature.

Generally, in this type of rotary electric machine, an armature includes a plurality of slots elongated in an axial direction on the outer periphery of an armature core that is fixedly fitted onto a shaft and by winding coils, which conduct an electric current to a pair of any commutator segments of a commutator integrally provided on the shaft, between any of the slots.

In this rotary electric machine, it has been proposed to use a winding device that includes a plurality of radial nozzles provided movably in the axial direction and a large-diameter round coil in order to wind the coils around the armature core (for example, refer to Japanese Published Unexamined Patent Application No. 2000-262023).

SUMMARY

In the related art, the coils are wound by use of a winding device that includes a plurality of the nozzles whose number equals the number of the slots formed on the outer periphery of the armature core. Therefore, two coils are held in each slot through a single coil-winding operation. The number (i.e., the number of conductors) of the coils held in all slots (armature) equals twice the number of the slots. Therefore, the number of conductors of the rotary electric machine that has repeatedly performed the winding operation a predetermined number of times equals a number obtained by multiplying twice the number of the slots by the number of times the winding operation has been performed.

On the other hand, in recent years, demand has been made to improve the performance of rotary electric machine and to reduce the size of rotary electric machine. To satisfy this demand, a proposal has been made for increasing the number of the slots so as to increase the number of the coils in the rotary electric machine. According to this rotary electric machine, the magnitude of torque is determined based on the number of the coils (i.e., the number of conductors) in the slots of the armature core. Therefore, if the winding operation is performed by use of a related art winding device, the number of conductors of the rotary electric machine will become integral multiples of twice the number of the slots, based on twice the number of the slots. Accordingly, there is a problem because a rotary electric machine in which the number of conductors (torque) equals the intermediate value of these numbers cannot be easily structured.

In consideration of the foregoing circumstances, an exemplary embodiment is an armature of a rotary electric machine. The armature may be constructed by forming coils that conduct an electric current to a pair of commutator segments between arbitrary slots among a plurality of slots. The slots may be formed in a circumferential direction on an outer periphery of an armature core so as to face in an axialdirection. The coils may be wound so that a number obtained by dividing the total number C of the coils disposed in the slots by twice the number S of the slots (C/2S) is not a natural number.

With this structure, the total number of the coils to be disposed in the slots of the rotary electric machine can be freely set, and a rotary electric machine having necessary torque can be constructed by setting the number of the coils at an appropriate number. Accordingly, a rotary electric machine having appropriate torque at need can be constructed.

The coils may be wound by performing a winding operation plural times with a winding device that includes a plurality of nozzles movable in the axial direction to draw out the coils to the slots of the armature core and that simultaneously wind the coils through a single winding operation. The number of times the winding operation is performed may not a multiple of natural number n if the number N of the nozzles of the winding device is set by dividing the number S of the slots by a natural number n (N=S/n). With this structure, the coil-winding operation can be performed smoothly and easily, and the armature can have excellent rotational balance.

In another exemplary embodiment, a method for producing an armature of a rotary electric machine may include forming coils that conduct an electric current to a pair of commutator segments between arbitrary slots among a plurality of slots formed in a circumferential direction on an outer periphery of an armature core so as to face in an axialdirection. The coils may be wound by performing a winding operation a plural times by use of a winding device that includes a plurality of nozzles movable in the axial direction to draw out the coils to the slots of the armature core and that simultaneously winds the coils through a single winding operation. The number of times the winding operation is performed may not a multiple of natural number n if the number N of the nozzles of the winding device is set by dividing the number S of the slots by natural number n (N=S/n). The coils may be wound so that a number obtained by dividing the total number C of the coils disposed in the slots by twice the number S of the slots (C/2S) is not a natural number.

According to this method, the total number of the coils to be disposed in the slots of the rotary electric machine can be freely set, and a rotary electric machine having necessary torque can be constructed by setting the number of the coils at an appropriate number. Accordingly, a rotary electric machine having appropriate torque at need can be constructed.

BRIEF DESCRIPTION OF THE DRAWINGS

The disclosure will be made with reference to the drawings, in which.

DETAILED DESCRIPTION OF EXEMPLARY EMBODIMENTS

Exemplary embodiments of the broad principles described herein are described with reference to FIGS. 1 through 5.

Figure 1:
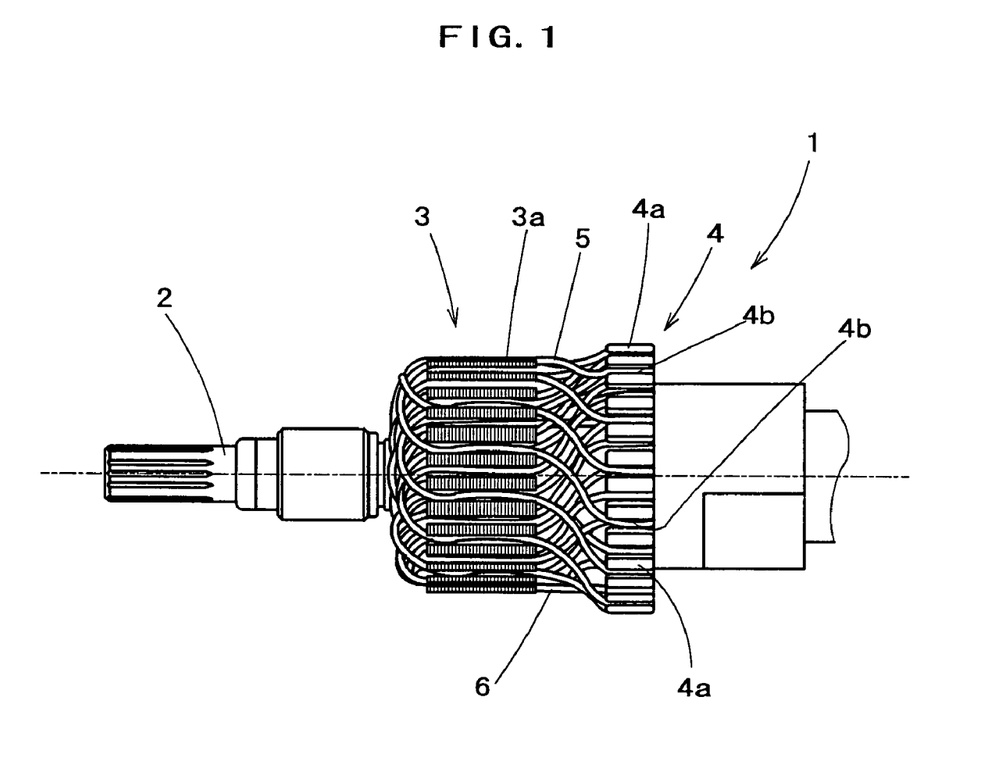
FIG. 1 is a side view of an armature.
Figure 2:
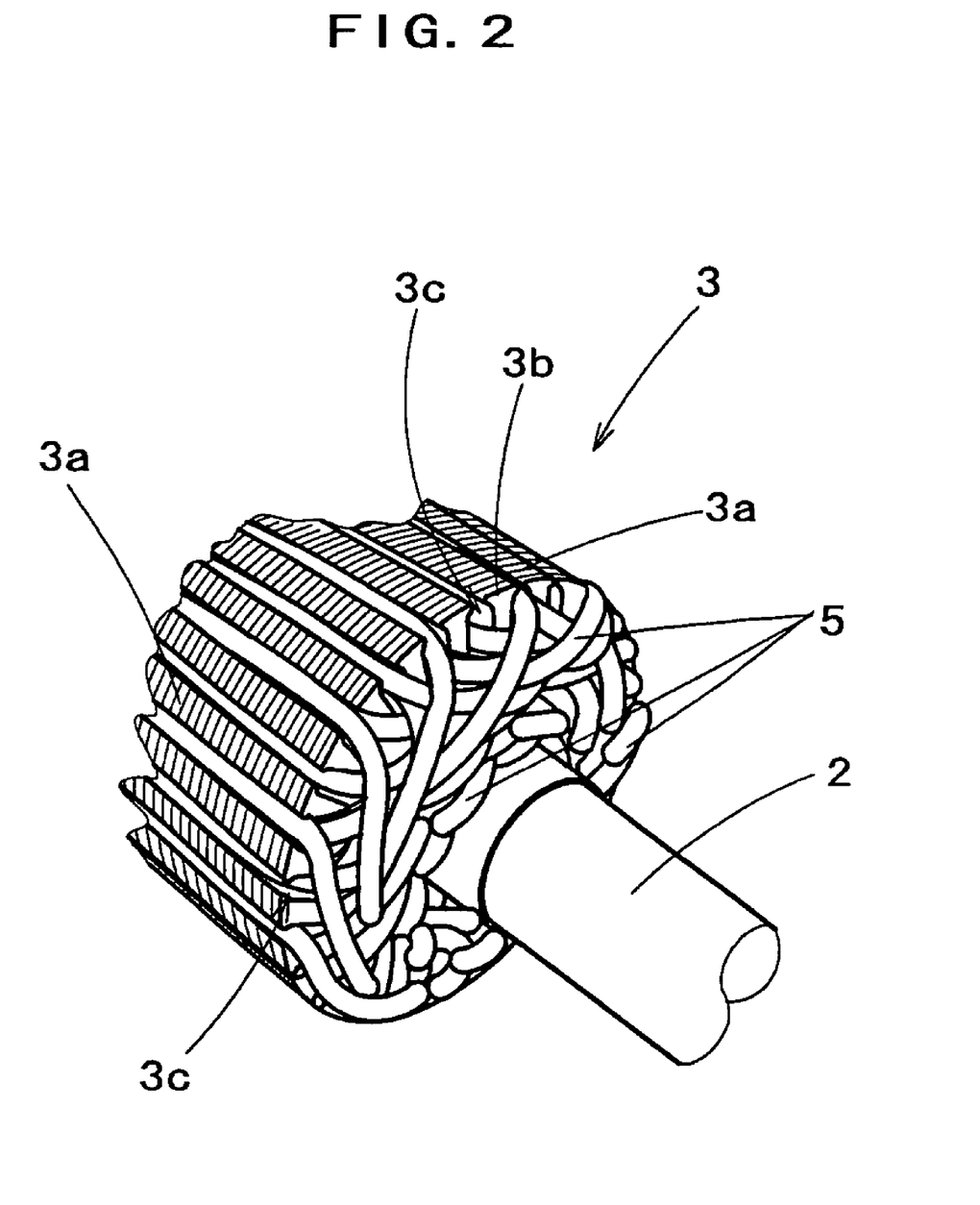
FIG. 2 is a perspective, partially-cutaway view of the armature.

In the drawings, an armature 1 is a component of an electric motor (rotary electric machine) that may be used as a driving source of electric equipment mounted on a vehicle. A shaft (armature shaft) 2 of the armature 1 may be provided with an armature core 3 formed by fitting a plurality of laminated, ring-shaped plates 3a onto the shaft 2. The shaft 2 of the armature 1 may be further provided with a commutator 4 positioned at an end of the armature core 3 and may be fixedly fitted onto the shaft 2. Coils 5 may be wound on the outer periphery of the armature core 3. Both ends (i.e., winding-start end and winding-finish end) of each of the coils 5 may be respectively connected to a pair of segments 4a, each of which may be an element of the commutator 4. This structure may be formed according to a currently known or later developed technique.

A plurality of teeth 3b (in this embodiment, thirty-two teeth), each of which is shaped like the capital letter T, may be formed in a circumferential direction on the outer periphery of the ring-shaped plates 3a that form the armature core 3. The ring-shaped plates 3a may be fitted onto the shaft 2 so as not to rotate with respect to the shaft 2 so as to form a plurality of slots 3c (in this embodiment, thirty-two slots) in a dovetail shape. The slots 3c may be long in the axial direction between the adjoining teeth 3b in the outer periphery of the armature core 3 at equal intervals in the circumferential direction.

On the other hand, in the commutator 4, the commutator segments 4a (in this embodiment, thirty-two), which is the same number as the slots 3c, may be united together into ring shape while being insulated. The segments 4a may include engaging grooves 4b to which both ends (i.e., winding-start end and winding-finish end) of each of the coils 5 are fixed.

The coils 5, wound on the outer periphery of the armature core 3, may be formed by winding larger-diameter round wires 6 around the armature core 3 through the slots 3c arranged at predetermined intervals. In this embodiment, the coils 5 may be wound thereon by a winding device 7 shown in FIGS. 3 and 4, which will be described later, in such a manner that when the total number (the number of conductors) of the coils 5 (the round wires 6) held in the slots 3C is a predetermined number C. If the total number C of the wires 6 (the number of conductors) is divided by twice the number S of the slots (C/2S), C is not a natural number. For example, in this embodiment, when C is set to be 96, the total number C of the wire divided by twice the number S of the slots (2S=2×32) is not a natural number, 1.5 (C/2S=1.5). In this way, the total number C of the wires 6, which is predetermined, may be set in accordance with the above-mentioned formula.

The winding-start end and the winding-finish end of each of the coils 5 wound therearound may, respectively, be caught by the engaging grooves 4b of a predetermined pair of segments 4a. An electric connection between each of the coils 5 and the segments 4a may be made by fusing the region of these engaging grooves 4b.

Figure 3:
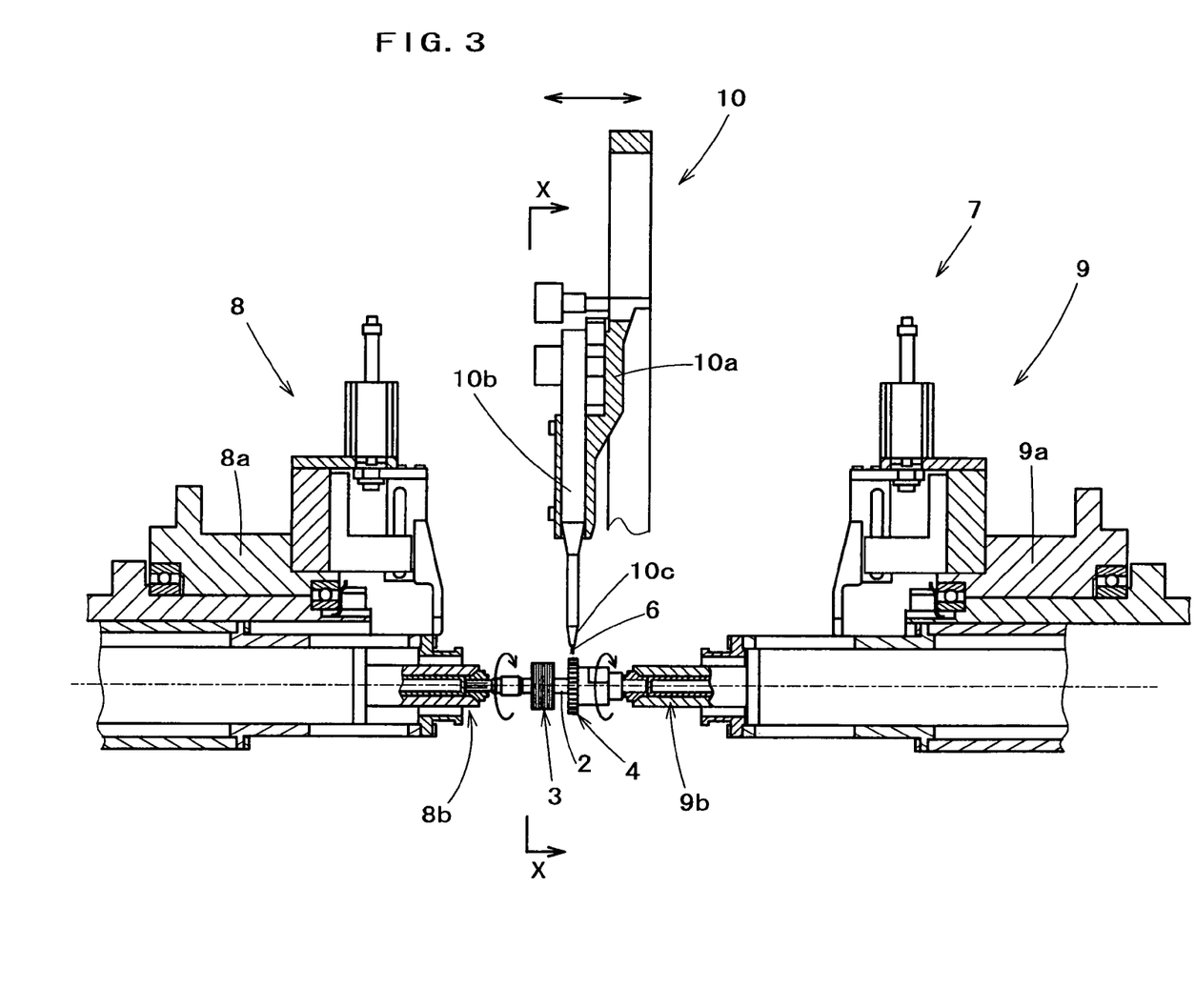
FIG. 3 is a cross-sectional, front view that explains a state in which wires are wound around an armature core, in which a part of a winding device is cut away.
Figure 4:
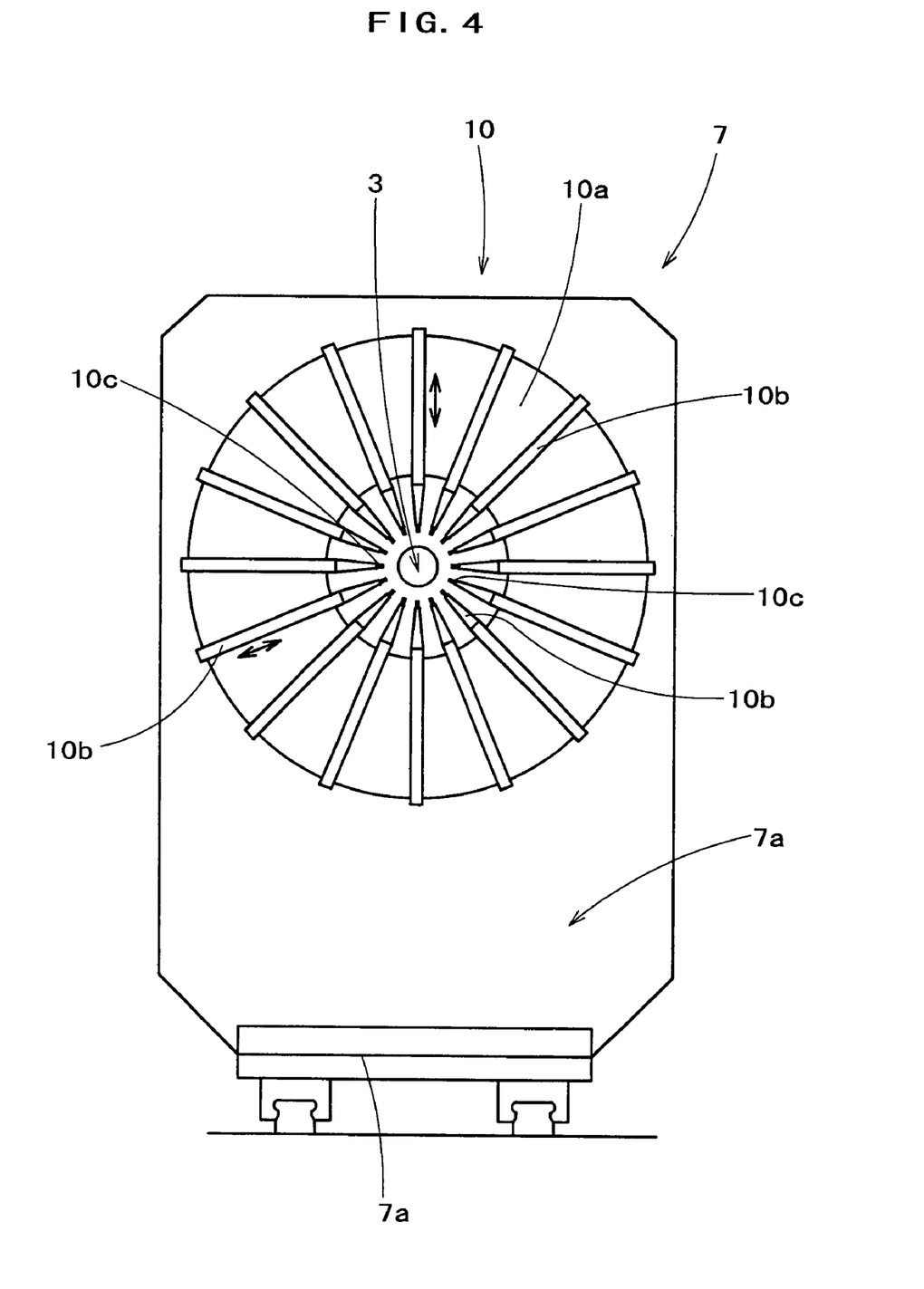
FIG. 4 is a cross-sectional view along line X-X of FIG. 3.

In the winding device 7, a pair of right and left shaft supporting portions 8, 9 that support both ends of the shaft 2 onto which the armature core 3 and the commutator 4 have been fitted may be provided on a supporting table 7a. The center of the shaft 2 that is supported by the shaft supporting portions 8, 9 may fit into a nozzle supporting portion 10.

The shaft supporting portions 8, 9, respectively, may include fixed parts 8a, 9a that are fixed to the supporting table 7a and clamp parts 8b, 9b, which integrally fix the shaft 2. The clamp parts 8b, 9b may be provided rotatably with respect to the shaft supporting portions 8, 9, respectively. The shaft supporting portions 8, 9 may synchronously rotate while supporting both ends of the shaft 2, thus making it possible to rotate the shaft 2 in a predetermined direction by a predetermined rotation quantity.

The nozzle supporting portion 10 may include a base part 10a, which may be a ring-shaped plate, and may be movable in rightward and leftward directions with respect to the supporting table 7a. For example, the base part 10a may be movable in the axial direction of the shaft 2, which is supported by the shaft supporting portions 8, 9. The base part 10a may include a plurality of nozzles 10b, each of which is long in the radial direction. Each of the nozzles 10b may be formed to draw out the round wire 6 from a tip 10c, which is formed on the inner side of the radius of the nozzle 10b. Each of the nozzles 10b may also be movable in the radial direction with respect to the base part 10a. For example, each of the nozzles 10b may proceed to and recede from the axis of the shaft 2 supported by the shaft supporting portions 8, 9. When the shaft 2 is supported by the shaft supporting portions 8, 9, the tip 10c of each of the nozzles 10b faces every other slot 3c formed in the armature core 3. For example, the number of the nozzles 10b may be obtained by dividing the number S (32) of the slots 3c by the natural number n (2), which is sixteen. These sixteen nozzles 10b may be radially arranged at equal intervals.

As described above, in the winding device 7, the shaft 2 may be set on the shaft supporting portions 8, 9, so that each tip 10c of the nozzle supporting portion 10 faces the radially outer side of the engaging groove 4b of every other segment 4a. In this arrangement, the nozzle supporting portion 10 may move in the rightward and leftward directions (i.e., in the axial direction) with respect to the supporting table 7a, the nozzle 10b may move in the radial direction with respect to the base part 10a, and the clamp parts 8b, 9b of the shaft supporting portions 8, 9 may rotate in forward or reverse directions with respect to the fixed parts 8a, 9a at appropriate timing. The coils 5 may also be wound around the armature core 3 by drawing out the round wire 6 from the tip 10c of the nozzle 10b or by stopping the drawing out of the round wire 6 therefrom at a predetermined speed.

Next, a process for forming the armature 1 according to an exemplary embodiment by using the winding device 7 is described. The process is described based on reference numerals given to the segments 4a and to the teeth 3b, respectively.

Figure 5:
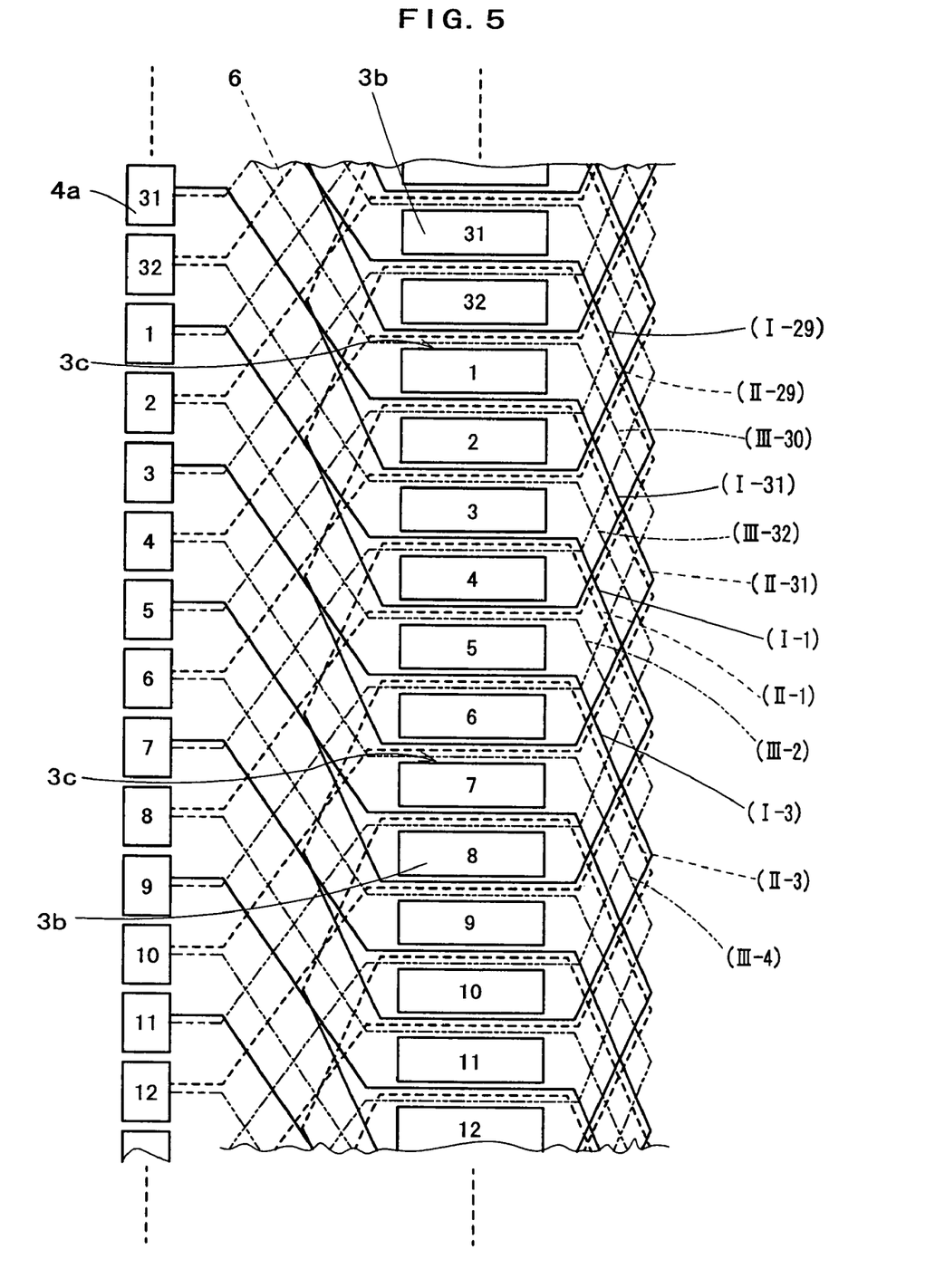
FIG. 5 is a development view that explains the wound state of coils in the armature.

In a first winding operation performed by the winding device 7, the coils 5 shown by the solid line in the development drawing of the armature shown in FIG. 5 may be wound. The tip 10c of the nozzle of the winding device 7 may then face an odd-numbered engaging groove 4b of the segments 4a. From this state, the first winding operation is started. In the first winding operation, for example, a round wire 6 drawn out from the state of being caught by the engaging groove 4b of the $1^{st}$ segment 4a is wound from the slot 3c between the (3-4)th teeth 3b (i.e., between the $3^{rd}$ tooth and the $4^{th}$ tooth) to the slot 3c between the (8-9)th teeth 3b, to form the (I-1)th coil 5 (note that "st," "nd," "rd," and "th" are suffixes used to designate ordinal numbers). Further, a round wire 6 drawn out from the state of being caught by the engaging groove 4b of the 3rd segment 4a that is one segment away from the 1st segment 4a may be wound from the slot 3c between the (5-6)th teeth 3b to the slot 3c between the (10-11)th teeth 3b, to form the (I-3)th coil 5.

In the first winding operation, in this example, sixteen coils 5 consisting of the (I-1)th coil, the (I-3)th coil, . . . , the (I-29)th coil and the (I-31)th coil may be formed in this way. In this example, there is one round wire 6 disposed in each of the slots 3c, and the armature 1 includes thirty-two conductors.

Subsequently, the coils 5 shown by the broken line in the development drawing of the armature of FIG. 5 may be formed in a second winding operation. In this winding operation, the coils 5 may again be wound on the places where the (I-1)th coil 5 to the (I-31)th coil 5 have been wound by the first winding operation, without being wound from the first winding operation to the segments 4a. In other words, a round wire 6 drawn out of the slot 3c between the (8-9)th teeth 3b may be wound from the slot 3c between the (3-4)th teeth 3b to the slot 3c between the (8-9)th teeth 3b to form the (II-1)th coil 5. The round wire 6 wound in this way may be caught by the engaging groove 4b of the 12th segment 4a, with ten of the segments 4a between the 1st segment 4a and the 12th segment 4a. Further, a round wire 6 drawn out of the slot 3c between the (10-11)th teeth 3b may be wound from the slot 3c between the (5-6)th teeth 3b to the slot 3c between the (10-11)th teeth 3b to form the (II-3)th coil 5. The round wire 6 wound in this way is caught by the engaging groove 4b of the 14th segment 4a (not shown), with ten of the segments 4a between the 3rd segment 4a and the 14th segment 4a.

In the second winding operation, in this example, sixteen coils 5 consisting of the (II-1)th coil, the (II-3) coil, . . . , the (II-29) coil and the (II-31)th coil may be formed in this way. In this example, there are two round wires 6 disposed in each of the slots 3c, the armature 1 includes sixty-four conductors.

Subsequently, a third winding operation may also be performed. The coils 5 wound by the third operation are shown by the chain double-dashed line in the development drawing of the armature of FIG. 5. In the third winding operation, for example, a round wire 6 drawn out from the 12th segment 4a may be caught by the engaging groove 4b of the 8th segment 4a, with three of the segments 4a between the 12th segment 4a and the 8th segment 4a. A round wire 6 drawn around from the 14th segment 4a (not shown) may be caught by the engaging groove 4b of the 10th segment 4a. That is, the round wire 6 is caught by the engaging groove 4b of an even-numbered segment of the segments 4a. The winding operation may be performed from this state.

For example, a round wire 6 drawn out from the state of being caught by the engaging groove 4b of the 2nd segment 4a may be wound from the slot 3c between the (4-5)th teeth 3b to the slot 3c between the (9-10)th teeth 3b to form the (III-2)th coil 5. The round wire 6 wound in this way may be caught by the engaging groove 4b of the 13th segment 4a (not shown), with ten of the segments 4a between the 2nd segment 4a and the 13th segment 4a. Further, a round wire 6 drawn out from the state of being caught by the engaging groove 4b of the 4th segment 4a may be wound from the slot 3c between the (6-7)th teeth 3b to the slot 3c between the (11-12)th teeth 3b to form the (III-4)th coil 5. The round wire 6 wound in this way may be caught by the engaging groove 4b of the 15th segment 4a (not shown), with ten of the segments 4a between the 4th segment 4a and the 15th segment 4a.

In the third winding operation, in this example, sixteen coils 5 consisting of the (III-2)th coil, the (III-4)th coil, . . . and the (III-32)th coil may be formed in this way. When the third winding operation is completed in this example, there are three round wires 6 disposed in each slot 3c, and the armature 2 includes ninety-six conductors.

In this embodiment, the number of the nozzles 10b may be obtained by dividing the number of the slots 3c by 2 (which is a natural number), and the winding operation may be performed three times a number of which differs from the natural number 2. As a result, the number (of conductors) of the coils 5 (the round wires 6), in the slots 3c equals 96 (i.e., C=96) in this example. Therefore, the number (96÷64) obtained by dividing the number of conductors (C=96) by twice the number S of the slots (32×2=64) is 1.5, which is not a natural number.

In this embodiment described above, the coils 5 wound around the armature 1 of the electric motor may be formed by winding the round wires 6 through the predetermined slots 3c of the armature core 3 by using the winding device 7. In this example, the coils 5 may be in a wound state in which a natural number is not produced when the number (96) C of conductors, which is the total number of the round wires 6 disposed in the slots 3c, is divided by twice the number (32) S of the slots 3c (i.e., is divided by 64). Therefore, unlike a related armature, the number C of conductors is never limited to twice the number of the slots 3c or to multiples thereof, and can be appropriately set with freedom regardless of the number of the slots 3c. Therefore, it becomes possible to structure an armature 1 corresponding to necessary torque and to improve the degree of freedom to set the torque.

In this embodiment, the coils 5 may be wound by the winding device 7. For example, the number of the nozzles 10b of the winding device 7 may equal the number N (=16) obtained by dividing the number S (=32) of the slots by 2 (natural number). According to this example, the number C of conductors that is the total number of the coils 5 in the slots 3c wound through the single winding operation of the winding device 7 is 32. This winding operation may be repeated three times the number of which differs from the natural number 2. Therefore, the number obtained when 96 (=32×3), which is the number of conductors, is divided by twice the number S of the slots 3c is not a natural number. As a result, coils may be wound by the winding device 7 like the related art although the armature 1 corresponding to the necessary torque can be structured, and the winding operation can be performed smoothly and easily. Further, in this case, because the winding device can only be provided with the number of the nozzles 10b, which equals the number obtained by dividing the number S of the slots 3c by a natural number, the winding device 7 can be produced at low cost.

Furthermore, in this embodiment, although the number may be obtained by dividing the number C of conductors by twice the number S of the slots is not a natural number, each slot S may hold three coils. Therefore, the coils 5 may be uniformly wound on the outer periphery of the armature 1. As a result, a defect, such as imbalance in the circumferential direction of the armature 1, can be reliably eliminated.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, as described above, an armature in which the number obtained by dividing the number C of conductors by twice the number of slots is not a natural number can be formed by using a winding device having thirty-two nozzles with respect to an armature core having thirty-two slots. In this example, wires may be drawn out from eight nozzles at intervals of three nozzles among the thirty-two nozzles. Eight coils may be wound on the outer periphery of the armature core through a single winding operation. The winding operation using the eight nozzles may be performed twice. Subsequently, coils are drawn out from the twenty-four nozzles, which are placed at the intervals of one nozzle after adjoining three nozzles among thirty-two nozzles, and an operation to form twenty-four coils on the outer periphery of the armature core may be performed once. Therefore, the armature may have eighty conductors. As a result of performing the winding operations using this winding device, the rotational balance in the circumferential direction thereof can be maintained, and the winding operations can be performed smoothly and easily.

Additionally, coils may be wound without using the winding device. For example, coils may be wound in such a way that a wire curved in U-letter shape is inserted from an end of a slot on the side where a commutator is not disposed. As a result, an armature may be formed so that the number obtained by dividing the number of conductors, which is the total number of coils held in slots, by twice the number of the slots is not a natural number. Also, in this case, a rotary electric machine of torque satisfying the purpose of use can be provided by setting the number of conductors at an appropriate number.

As described above, an armature of a rotary electric machine and the method for producing same is useful in constructing an electrical component of a vehicle and like, especially suitable for constructing a rotary electric machine, which has high performance and is small in size.

The invention claimed is:

1. A method for producing an armature of a rotary electric machine, the armature including:
   an armature core that is formed on an armature shaft;
   a plurality of slots that are formed in a circumferential direction on an outer periphery of the armature core so as to face in an axial direction;
   a plurality of commutator segments that are formed in a circumferential direction on an outer periphery of the armature shaft; and
   a plurality of coils that are formed on an outer periphery of the armature core to generate magnetic fields by winding a conductor through an arbitrary pair of slots among the plurality of slots, winding-start and winding-ends of the conductors being connected to a predetermined arbitrary pair of commutator segments among the plurality of commutator segments, the method comprising:
   using a winding device that includes a plurality of nozzles movable in both the axial direction and a radial direction with respect to the armature so as to draw out a plurality of conductors to the plurality of slots of the armature core such that the plurality of coils are simultaneously formed through a single winding operation, wherein
   the single winding operation includes:
   drawing out each of the plurality of conductors from each of the plurality of nozzles;
   winding the drawn-out conductor through one arbitrary slot among the plurality of slots from a side of the plurality of commutator segments, and
   winding the drawn-out conductor through another arbitrary slot among the plurality of slots to the side of the plurality of commutator segments in a manner in which at least one of the plurality of slots is interposed between the two arbitrary slots around which the drawn-out conductor is wound, one of the plurality of conductors being disposed into two arbitrary slots of the plurality of slots by using one of the plurality of nozzles through the single winding operation, wherein
   when a number N of the plurality of nozzles of the winding device is set at a number (N=S/n) obtained by dividing a total number S of the plurality of slots by a natural number n,
   a number of the plurality of conductors disposed in the plurality of slots is 2S/n per single winding operation,
   a number of times of the winding operation performed by the winding device is not a multiple of the natural number n, and
   the conductors that form the plurality of coils are wound so that a number obtained by dividing a total number C of the conductors, which are wound around all of the plurality of slots to form the plurality of coils, by twice the number S of the total number of the plurality of slots of the armature core (C/2S) is not a natural number.

2. The method for producing an armature of a rotary electric machine according to claim 1, wherein the plurality of the slots are formed at equal intervals on the outer periphery.

3. The method for producing an armature of a rotary electric machine according to claim 2, wherein the each of the plurality of slots have a dovetail shape.

4. The method for producing an armature of a rotary electric machine according to claim 2, wherein an end of each of the commutator segments includes an engaging groove.

5. The method for producing an armature of a rotary electric machine according to claim 3, wherein an end of a conductor is fixed to the engaging groove.

6. The method for producing an armature of a rotary electric machine according to claim 1, wherein the conductors are wound uniformly on the outer periphery of the armature core.

7. The method for producing an armature of a rotary electric machine according to claim 1, wherein the armature includes a plurality of teeth that are formed in a circumferential direction on the outer periphery of the armature core.

8. The method for producing an armature of a rotary electric machine according to claim 1, wherein n=2.

* * * * *